(12) United States Patent
Itaba et al.

(10) Patent No.: US 11,236,697 B2
(45) Date of Patent: Feb. 1, 2022

(54) FUEL INJECTION CONTROL DEVICE AND FUEL INJECTION CONTROL METHOD

(71) Applicant: HITACHI AUTOMOTIVE SYSTEMS, LTD., Hitachinaka (JP)

(72) Inventors: Fumihiro Itaba, Hitachinaka (JP); Osamu Mukaihara, Hitachinaka (JP); Akira Iizuka, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/769,649

(22) PCT Filed: Feb. 1, 2019

(86) PCT No.: PCT/JP2019/003565
§ 371 (c)(1),
(2) Date: Jun. 4, 2020

(87) PCT Pub. No.: WO2019/163477
PCT Pub. Date: Aug. 29, 2019

(65) Prior Publication Data
US 2021/0180534 A1    Jun. 17, 2021

(30) Foreign Application Priority Data

Feb. 26, 2018    (JP) .............................. JP2018-032054

(51) Int. Cl.
*F02D 41/24*    (2006.01)
*F02D 41/40*    (2006.01)

(52) U.S. Cl.
CPC ....... *F02D 41/2467* (2013.01); *F02D 41/402* (2013.01); *F02D 41/2403* (2013.01);
(Continued)

(58) Field of Classification Search
CPC .............. F02D 41/2467; F02D 41/402; F02D 2200/0616; F02D 2200/0602; F02D 41/2403
See application file for complete search history.

(56) References Cited

U.S. PATENT DOCUMENTS 4,881,505 A * 11/1989 Tomisawa ............... F02D 41/14
123/480
5,732,675 A *  3/1998 Yoshida ................ F02D 41/008
123/305

(Continued)

FOREIGN PATENT DOCUMENTS

JP    2003-254139 A    9/2003
JP    2004-245053 A    9/2004

(Continued)

OTHER PUBLICATIONS

International Search Report, PCT/JP2019/003565, dated May 21, 2019, 2 pgs.

*Primary Examiner* — Phutthiwat Wongwian
*Assistant Examiner* — Susan E Scharpf
(74) *Attorney, Agent, or Firm* — Volpe Koenig (57) ABSTRACT

The present invention provides a high-efficiency and highly-reliable fuel injection control device that controls a fuel injection valve of an internal combustion engine and can perform injection amount control in accordance with a deterioration degree of the fuel injection valve. A fuel injection control device controlling a fuel injection valve of an internal combustion engine includes a deterioration determination unit that determines a deterioration state of the fuel injection valve, an injection amount learning unit that learns the injection amount of the fuel injection valve, and a learning frequency change unit that changes the learning (Continued)

frequency of the injection amount learning unit in accordance with the deterioration state of the fuel injection valve.

11 Claims, 8 Drawing Sheets

(52) U.S. Cl.
CPC ............... *F02D 2200/0602* (2013.01); *F02D 2200/0616* (2013.01)

(56) References Cited

U.S. PATENT DOCUMENTS

| | | | | |
|---|---|---|---|---|
| 6,102,005 | A * | 8/2000 | Kasen | F02D 41/38 123/446 |
| 7,319,930 | B2 * | 1/2008 | Dietl | F02D 41/0085 123/436 |
| 7,363,912 | B2 * | 4/2008 | Asano | F02D 41/045 123/436 |
| 7,373,918 | B2 * | 5/2008 | Uchiyama | F02D 41/403 123/299 |
| 7,729,845 | B2 * | 6/2010 | Iwashita | F02D 41/405 701/104 |
| 7,845,343 | B2 * | 12/2010 | Imai | F02D 41/2438 123/674 |
| 7,925,419 | B2 * | 4/2011 | Yamaguchi | F02D 41/2441 701/104 |
| 8,433,497 | B2 * | 4/2013 | Okada | F02D 41/403 701/103 |
| 8,596,245 | B2 * | 12/2013 | Hiratani | F02D 41/402 123/436 |
| 10,458,354 | B2 * | 10/2019 | Horii | F02D 37/02 |
| 2003/0164166 | A1 * | 9/2003 | Takeuchi | F02D 41/2467 123/674 |
| 2010/0224175 | A1 * | 9/2010 | Hori | F02D 41/2454 123/674 |
| 2012/0116654 | A1 * | 5/2012 | Toyohara | F02D 41/402 701/104 |
| 2018/0017004 | A1 * | 1/2018 | Horii | F02D 41/1498 |
| 2018/0195450 | A1 * | 7/2018 | Mukaihara | F02D 41/2448 |

FOREIGN PATENT DOCUMENTS

| | | |
|---|---|---|
| JP | 2005-325794 A | 11/2005 |
| JP | 2014-034933 A | 2/2014 |
| JP | 2014-058916 A | 4/2014 |
| WO | 2017/006814 A1 | 1/2017 |

* cited by examiner

FUEL INJECTION CONTROL DEVICE AND FUEL INJECTION CONTROL METHOD

TECHNICAL FIELD

The present invention relates to a fuel injection control device that controls a fuel injection valve of an internal combustion engine and a control method thereof, and particularly to a technique effective in enhancing the efficiency of the internal combustion engine.

BACKGROUND ART

From the viewpoint of strengthening fuel efficiency and exhaust regulations for automobiles in recent years, it has been required to achieve low fuel consumption and high output of an internal combustion engine at the same time, and to conform the internal combustion engine to a wide driving field. As means for achieving the object, it has been required to expand a dynamic range of a fuel injection valve.

In order to expand the dynamic range of the fuel injection valve, it is necessary to improve flow characteristics while securing the conventional still flow characteristics. As a method of improving the flow characteristics, a reduction in minimum injection amount by half lift control has been known.

The half lift control is performed with high accuracy in a state (hereinafter, referred to as a half lift area) before a valve element included in the fuel injection valve completely reaches a valve opening position (hereinafter, referred to as full lift). However, it has been known that a variation in the injection amount in the half lift area is increased due to an individual difference in the fuel injection valve. Therefore, various techniques for detecting an individual difference generated in each fuel injection valve have been proposed.

As a background art of the technical field, for example, there is a technique as described in Patent Literature 1. Patent Literature 1 discloses a technique for indirectly detecting an individual difference related to a valve opening operation (specifically, the timing at which a valve element became a valve opening state) of a fuel injection valve on the basis of electric characteristics. Likewise, a technique for detecting an individual difference related to a valve closing operation of the fuel injection valve on the basis of electric characteristics is disclosed.

Meanwhile, a variation in the injection amount of the fuel injection valve is also caused by deterioration with the lapse of time due to settling of a spring, grinding of a surface of a movable core, and the like. Therefore, individual difference learning is performed when predetermined conditions are established and the learning result is reflected on the following injection amount control, so that a variation in the injection amount due to deterioration of each fuel injection valve can be corrected. As the individual difference learning, a technique of measuring the valve closing time of the fuel injection valve in a state where the condition of the engine is stabilized, for example, when the engine is in an idle state has been known.

CITATION LIST

Patent Literature

Patent Literature 1: WO2017/006814

SUMMARY OF INVENTION

Technical Problem

However, the individual difference learning described in Patent Literature 1 is performed once after the engine starts on the assumption that the fuel injection valve is exchanged in a market. Namely, since the individual difference learning is performed after the engine starts and the learning result is reflected on the following injection amount control, the injection amount cannot be corrected in the case where learning conditions are not established.

As a result, an output difference occurs in each cylinder of the engine, and thus there is a risk that a fluctuation in torque is increased, leading to deterioration of fuel efficiency and an increase in engine vibration.

In addition, in the case where the individual difference learning is not completed, half lift control cannot be executed in an area where a minimal injection is necessary, possibly leading to worsening of fuel efficiency.

The individual difference learning of the fuel injection valve is generally performed on an engine assembly line or by actually starting the engine on a vehicle assembly line. In addition, in the case where the fuel injection valve was replaced with a new one in a market, the learning is performed by starting the engine. Therefore, the individual difference learning performed during driving is desirably performed at learning frequency in consideration of deterioration of the fuel injection valve.

Accordingly, an object of the present invention is to provide a high-efficiency and highly-reliable fuel injection control device that controls a fuel injection valve of an internal combustion engine and can perform injection amount control in accordance with a deterioration degree of the fuel injection valve, and a control method thereof.

Solution to Problem

In order to solve the problem, the present invention provides a fuel injection control device controlling a fuel injection valve of an internal combustion engine, the device comprising: a deterioration determination unit that determines a deterioration state of the fuel injection valve; an injection amount learning unit that learns the injection amount of the fuel injection valve; and a learning frequency change unit that changes the learning frequency of the injection amount learning unit in accordance with the deterioration state of the fuel injection valve.

In addition, the present invention provides a fuel injection control method for controlling a fuel injection valve of an internal combustion engine, the method comprising: (a) a step of counting the number of times of injections of the fuel injection valve; (b) a step of estimating a deterioration state of the fuel injection valve on the basis of the number of times of injections counted in the step (a); and (c) a step of correcting the injection amount of the fuel injection valve on the basis of the deterioration state of the fuel injection valve estimated in the step (b).

Advantageous Effects of Invention

According to the present invention, it is possible to realize a high-efficiency and highly-reliable fuel injection control device that controls a fuel injection valve of an internal combustion engine and can perform injection amount control in accordance with a deterioration degree of the fuel injection valve, and a control method thereof.

Accordingly, it is possible to suppress problems such as worsening of fuel efficiency and engine vibration due to deterioration of the fuel injection valve.

Problems, configurations, and effects other than those described above will become apparent from the description of the following embodiments.

DESCRIPTION OF EMBODIMENTS

Hereinafter, embodiments of the present invention will be described using the drawings. It should be noted that the same configuration will be followed by the same sign in each drawing, and a detailed explanation for a duplicated part will be omitted.

First Embodiment

Figure 1:
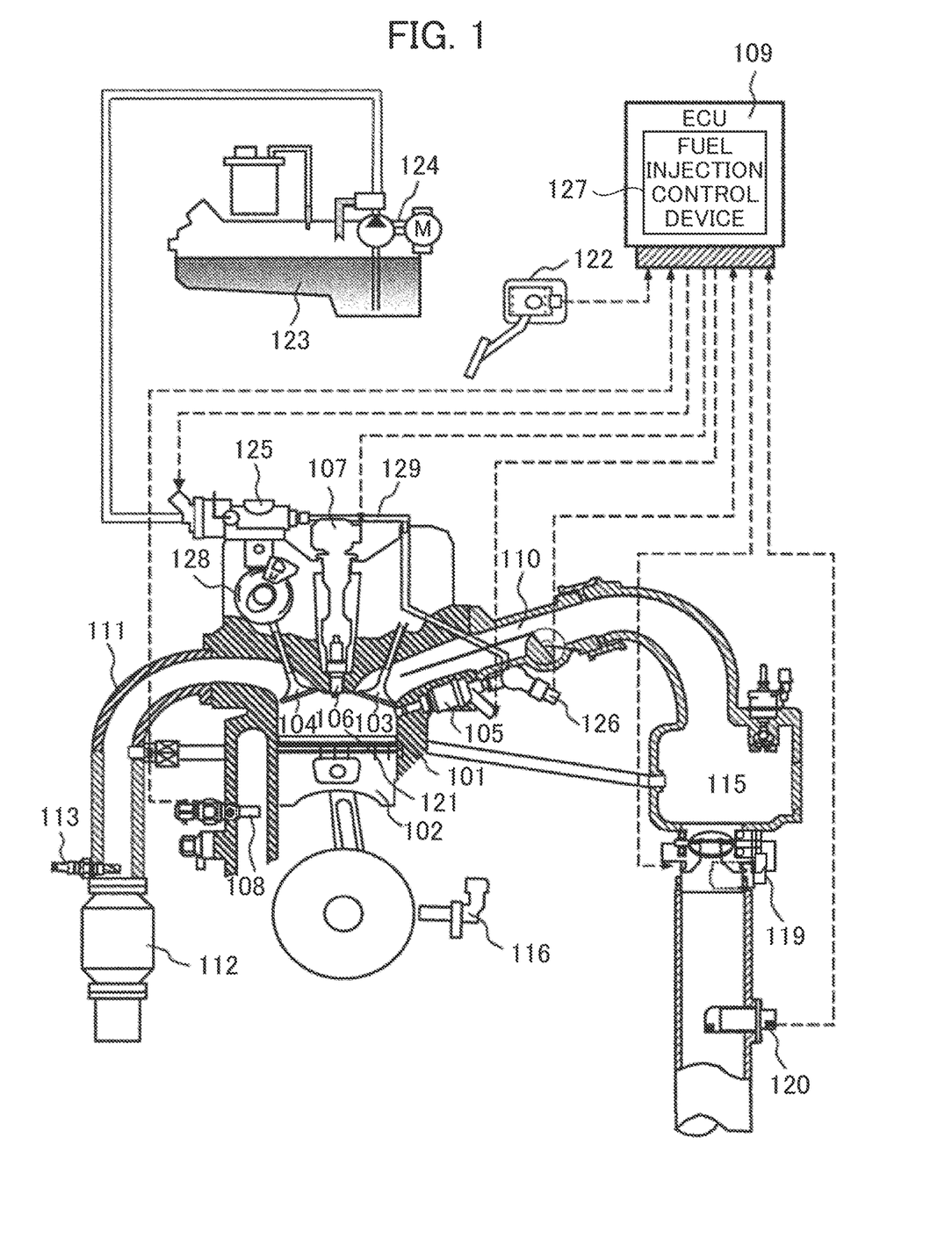
FIG. 1 is an entire configuration diagram for showing a basic configuration of an internal combustion engine according to an embodiment of the present invention.

First, an internal combustion engine (engine) in which a fuel injection control device of the embodiment is mounted will be described with reference to FIG. 1. FIG. 1 shows a basic configuration example of an internal combustion engine in which a control device (fuel injection control device) of a fuel injection valve according to the present invention is mounted.

In FIG. 1, air (intake air) sucked into an internal combustion engine 101 passes through an air flow meter 120 to be sucked into a throttle valve 119 and a collector 115 in this order, and is then supplied to a combustion chamber 121 through an intake pipe 110 and an intake valve 103 provided in each cylinder.

On the other hand, fuel is fed from a fuel tank 123 to a high pressure fuel pump 125 provided in the internal combustion engine 101 by a low pressure fuel pump 124. The high pressure fuel pump 125 vertically moves a plunger provided in the high pressure fuel pump 125 using power transmitted from an exhaust cam shaft (not shown) having an exhaust cam 128, and pressurizes (boosts) the fuel in the high pressure fuel pump 125. In addition, on the basis of a control command value from an ECU (electronic control device) 109, an opening/closing valve provided at a suction port of the high pressure fuel pump 125 is controlled by a solenoid, so that the pressure (fuel pressure) of the fuel discharged from the high pressure fuel pump 125 becomes a desired pressure.

Accordingly, the pressurized fuel is fed to a fuel injection valve 105 through a high pressure fuel pipe 129, and the fuel injection valve 105 directly injects the fuel to the combustion chamber 121 on the basis of a command of a fuel injection control device (a control device for the fuel injection valve) 127 provided in the ECU 109.

It should be noted that a fuel pressure sensor 126 for measuring the pressure in the high pressure fuel pipe 129 is provided in the internal combustion engine 101 to control the high pressure fuel pump 125, and the ECU 109 performs so-called feedback control on the basis of the value of the sensor in general so that the fuel pressure in the high pressure fuel pipe 129 becomes a desired pressure. Further, an ignition coil 107 and an ignition plug 106 are provided for each combustion chamber 121 in the internal combustion engine 101, and energization control for the ignition coil 107 and ignition control by the ignition plug 106 are performed by the ECU 109 at a predetermined timing.

Accordingly, a mixture obtained by mixing the intake air and the fuel in the combustion chamber 121 is combusted by a spark emitted from the ignition plug 106, and a piston 102 is pushed down by the pressure. An exhaust gas generated by the combustion is discharged to an exhaust pipe 111 through an exhaust valve 104. The exhaust pipe 111 is provided with a three-way catalyst 112 for purifying the exhaust gas.

The above-described fuel injection control device 127 is incorporated in the ECU 109, and signals of a crank angle sensor 116 measuring the crank angle of a crankshaft (not shown) of the internal combustion engine 101, the air flowmeter 120 indicating the amount of intake air, an oxygen sensor 113 detecting the concentration of oxygen in the exhaust gas, an accelerator opening sensor 122 indicating the opening of an accelerator operated by a driver, the fuel pressure sensor 126, and the like.

The signals input from each sensor will be further described. The ECU 109 calculates required torque of the internal combustion engine 101 on the basis of the signal of the accelerator opening sensor 122, and determines whether or not to be in an idle state. In addition, the ECU 109 is provided with rotational speed detection means that calculates the rotational speed (hereinafter, referred to as an engine speed) of the internal combustion engine 101 on the basis of the signal of the crank angle sensor 116 and means that determines whether or not the three-way catalyst 112 is in a heated state on the basis of a cooling water temperature of the internal combustion engine 101 obtained from a water temperature sensor 108 and elapsed time after the internal combustion engine 101 is started.

In addition, the ECU 109 calculates the amount of intake air necessary for the internal combustion engine 101 on the basis of the above-described required torque for the internal combustion engine 101 to output an opening signal corresponding to the amount of intake air to the throttle valve 119, and the fuel injection control device 127 calculates the amount of fuel in accordance with the amount of intake air to output a fuel injection signal in accordance with the amount of fuel to the fuel injection valve 105 and to further output an ignition signal to the ignition coil 107.

Figure 2:
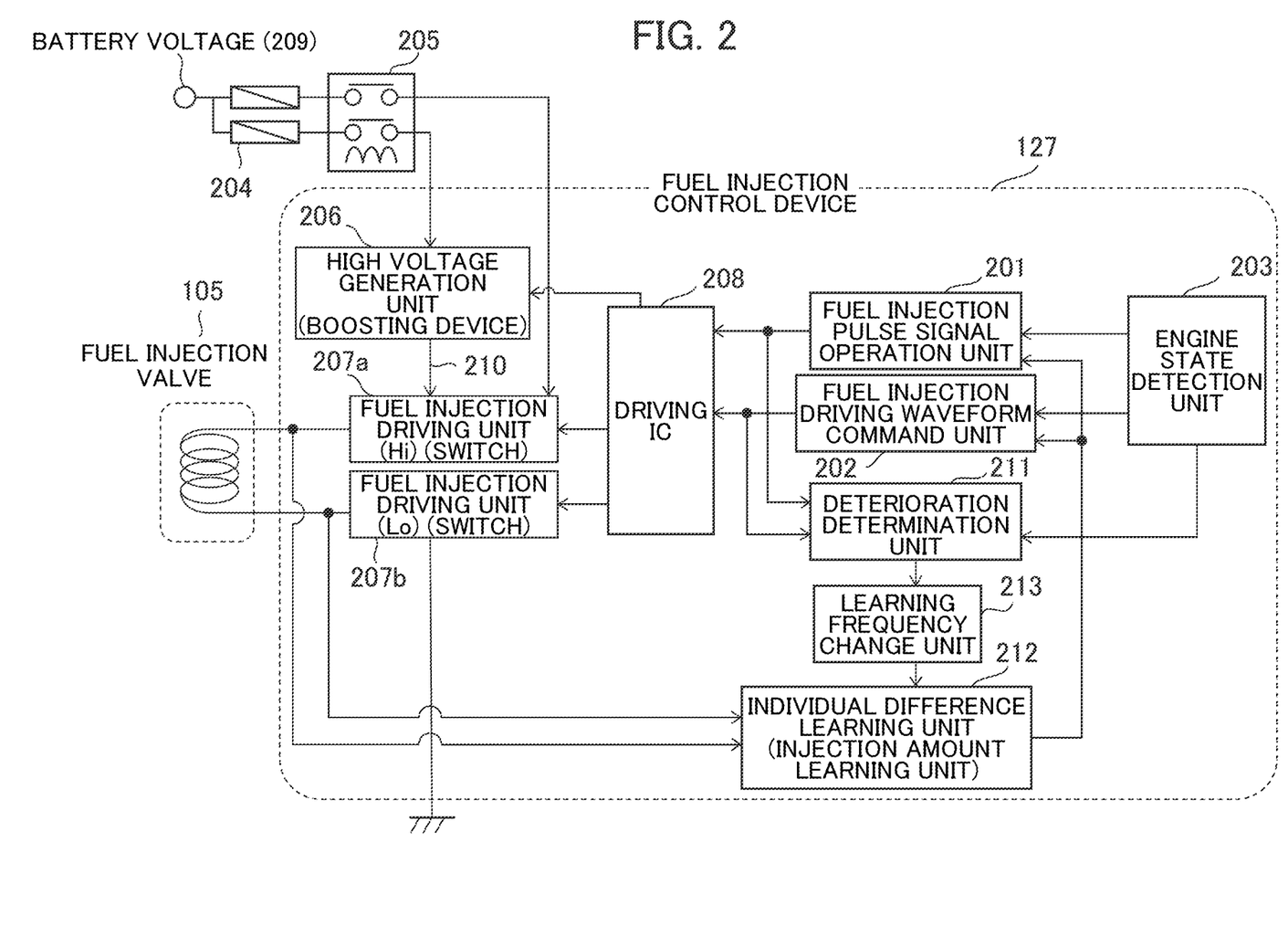
FIG. 2 is a basic configuration diagram of a fuel injection control device 127 in FIG. 1.

Next, the fuel injection control device 127 of the ECU 109 and the fuel injection valve 105 in FIG. 1 will be described with reference to FIG. 2.

The fuel injection control device 127 basically includes, as fuel injection control units, a fuel injection pulse signal operation unit 201 and a fuel injection driving waveform command unit 202, an engine state detection unit 203, an individual difference learning unit 212, a deterioration determination unit 211, a learning frequency change unit 213, a driving IC 208, a high voltage generation unit (boosting device) 206, and fuel injection driving units (switches) 207a and 207b.

It should be noted that the individual difference learning unit 212 is also referred to as an injection amount learning unit to learn (detect) an individual difference (a difference in fuel infection amount) in the fuel injection valve 105, as will be described later.

The engine state detection unit 203 summarizes and provides various pieces of information such as the above-described engine speed, amount of intake air, cooling water temperature, fuel pressure, and a failure state of the internal combustion engine (engine), the fuel injection pulse signal operation unit 201 operates an injection pulse (width) for defining a fuel injection period of the fuel injection valve 105 on the basis of various pieces of information obtained from the engine state detection unit 203, and the fuel injection driving waveform command unit 202 calculates a command value of a driving current supplied to maintain the opening/closing of the fuel injection valve 105 to be output to the driving IC 208.

The high voltage generation unit 206 generates a high power supply voltage (hereinafter, referred to as a high voltage) 210 needed when the electromagnetic solenoid-type fuel injection valve 105 is opened on the basis of a battery voltage 209 supplied through a fuse 204 and a relay 205. In addition, the high voltage generation unit 206 boosts the battery voltage 209 to reach a desired target high voltage on the basis of a command from the driving IC 208. Accordingly, as power supply of the fuel injection valve 105, two systems of the high voltage 210 to secure the valve opening force of the valve element and the battery voltage 209 to maintain the valve opening so as to prevent the valve element from closing after being opened are provided.

The two fuel injection driving unit (Hi) 207a and the fuel injection driving unit (Lo) 207b are provided on the upstream side and the downstream side of the fuel injection valve 105, respectively, to supply a driving current to the fuel injection valve 105. The driving IC 208 switches the fuel injection driving units 207a and 207b that are switches on the basis of the injection pulse (width) operated by the fuel injection pulse signal operation unit 201 and the driving current waveform operated by the fuel injection driving waveform command unit 202 to select the high voltage 210 or the battery voltage 209 supplied to the fuel injection valve 105, so that the driving current supplied to the fuel injection valve 105 is controlled.

Next, with reference to FIG. 3 and FIG. 4, a driving method of the fuel injection valve 105 and a method of detecting an individual difference in the fuel injection valve 105 executed by the individual difference learning unit 212 will be described.

Figure 3:
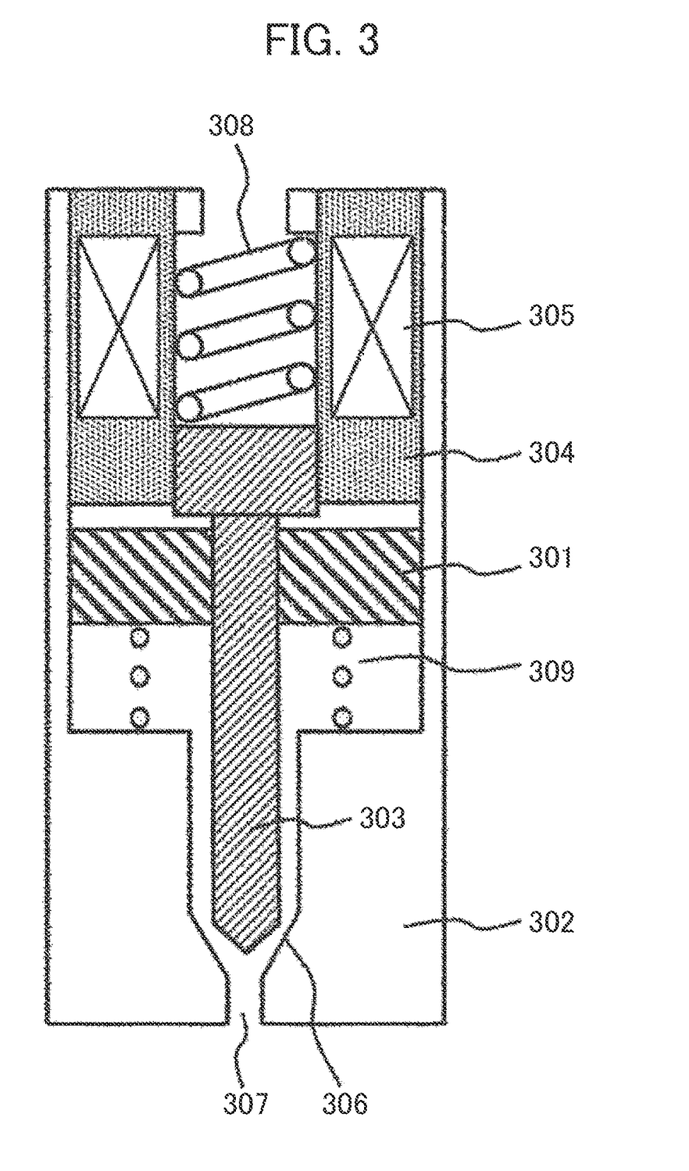
FIG. 3 is a diagram for showing a structure example of a fuel injection valve 105 in FIG. 1.

FIG. 3 is a cross-sectional view for showing a configuration example of the fuel injection valve 105. A housing 302 is provided outside the fuel injection valve 105, and a stator core 304 is fixed to the housing 302. In addition, a solenoid 305 is arranged about the central axis of the fuel injection valve 105.

A valve element 303 that vertically moves is arranged on the central axis of the fuel injection valve 105. A movable core 301 is arranged around the valve element 303. A set spring 308 to press down the valve element 303 in the direction of a valve seat 306 is provided above the valve element 303.

The inside of the housing 302 is filled with fuel. When a current flows in the solenoid 305, the movable core 301 is drawn to the solenoid 305, and a lower end of the valve element 303 is separated from the valve seat 306. Then, the fuel is injected from an injection hole 307 that was blocked by the valve element 303 so far and provided at the housing 302.

In addition, a zero spring 309 is arranged between the movable core 301 and the housing 302, and is configured to allow the movable core 301 to return to the initial position with the balance of the spring after the fuel injection.

Figure 4:
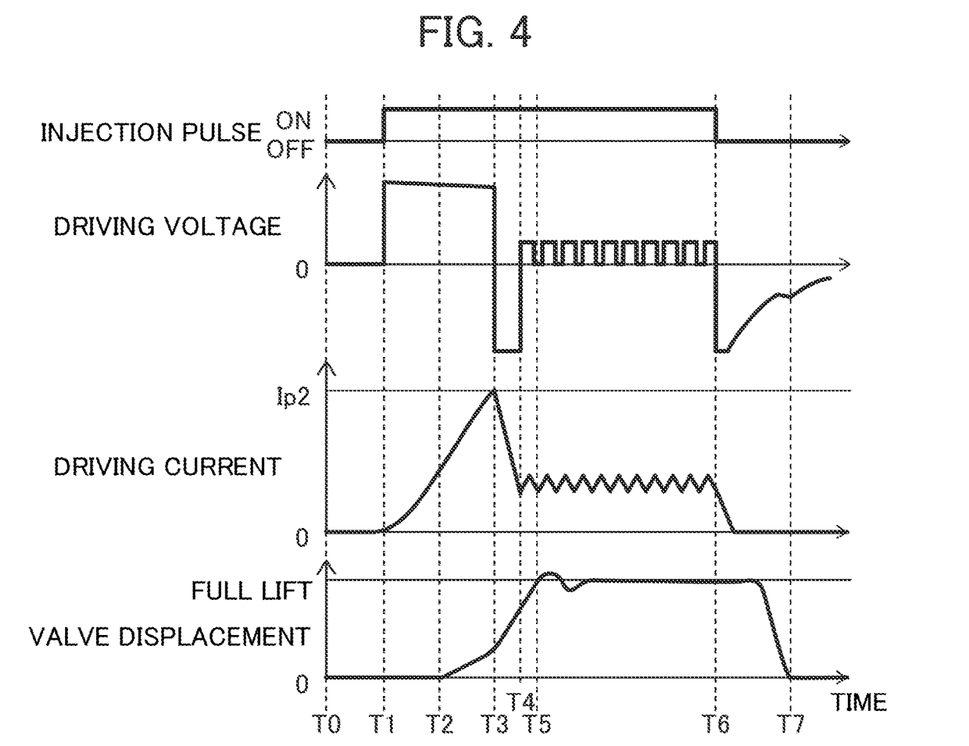
FIG. 4 is a diagram for showing an example of individual difference learning of the fuel injection valve.

FIG. 4 is a diagram for showing an example of individual difference learning of the fuel injection valve, and shows, in a time-series manner, examples of the injection pulse, the driving voltage, the driving current, and the displacement amount of the valve element 303 (valve displacement) when the fuel is injected from the fuel injection valve 105 to the inside of the combustion chamber 121.

Since the injection pulse output from the fuel injection pulse signal operation unit 201 is turned off between Times T0 to T1, the fuel injection driving units 207a and 207b are turned off, and no driving current is supplied to the fuel injection valve 105. Thus, the valve element 303 is biased towards the closing direction of the valve seat 306 by the biasing force of the set spring 308 of the fuel injection valve 105, and a lower end of the valve element 303 is kept to abut on the valve seat 306 (namely, the injection hole 307 is kept in a closed state). Thus, no fuel is injected.

Next, the injection pulse is turned on at Time T1, the fuel injection driving unit (Hi) 207a and the fuel injection driving unit (Lo) 207b are turned on, and the high voltage 210, the fuel injection valve 105, and the ground voltage are conducted (the driving voltage applied to the solenoid 305 is the high voltage 210). When a driving current is supplied to the solenoid 305, a magnetic flux is generated between the stator core 304 and the movable core 301, and magnetic attraction force acts on the movable core 301. When the driving current supplied to the solenoid 305 increases and the magnetic attraction force acting on the movable core 301 exceeds the biasing force by the zero spring 309, the movable core 301 starts to move by being sucked towards the direction of the stator core 304 (Times T1 to T2).

When the movable core 301 moves by only a predetermined length, the movable core 301 and the valve element 303 start to move together (Time T2), and the valve element 303 is separated from the valve seat 306 to be opened. Then, the fuel is injected to the inside of the combustion chamber 121.

The movable core 301 and the valve element 303 move together until the movable core 301 collides with the stator core 304. However, if the movable core 301 and stator core 304 forcefully collide with each other, the movable core 301 is bounced back at the stator core 304, and the flowing amount of fuel injected from the valve hole 307 is disturbed. Accordingly, before the movable core 301 collides with the stator core 304 (Time T3), namely, when the driving current reaches a peak current Ip2, the fuel injection driving units 207a and 207b are turned off, and the driving current is decreased by decreasing the driving voltage applied to the solenoid 305, so that the momentum of the movable core 301 and the valve element 303 is reduced (Times T3 to T4).

Since only the magnetic attraction force sufficient to draw the movable core 301 to the stator core 304 is supplied from Time T4 to Time T6 when the injection pulse rises, the fuel injection driving unit (Hi) 207a is intermittently turned on (PMW control is performed for the fuel injection driving unit (Hi) 207a) in a state where the fuel injection driving unit (Lo) 207b is kept in an ON state, and the driving voltage applied to the solenoid 305 is intermittently set to the battery voltage 209. Then, the driving current flowing in the solenoid 305 is controlled to fall within a predetermined range.

When the injection pulse is turned off at Time T6, both of the fuel injection driving units 207a and 207b are turned off. When the driving voltage applied to the solenoid 305 is decreased and the driving current flowing in the solenoid 305 is decreased, the magnetic flux generated between the stator core 304 and the movable core 301 gradually disappears, and the magnetic attraction force acting on the movable core 301 disappears. As a result, the valve element 303 is pushed back towards the closing direction of the valve seat 306 with a delay of predetermined time by the biasing force of the set spring 308 and the pressing force by the fuel pressure in the combustion chamber 121. Then, at Time T7, the valve element 303 is returned to the original position, and a lower end of the valve element 303 is closed by abutting on the valve seat 306 to stop the injection of the fuel.

It should be noted that from Time T6 when the injection pulse is turned off, the high voltage 210 is supplied in the opposite direction when the fuel injection valve 105 is driven towards the opening direction by quickly removing residual magnetic force in the fuel injection valve 105 to close the valve element soon.

In the individual difference in the fuel injection valve 105, a variation in the load of the set spring 308 is dominant, and is generated because the behavior of the valve element 303 differs depending on individuals. The individual difference learning unit 212 of the fuel injection control device 127 shown in FIG. 2 can detect an individual difference by detecting an inflexion point appearing in a driving voltage during the valve opening operation of the fuel injection valve 105.

On the other hand, when closing the valve element 303 of the fuel injection valve 105, the zero spring 309 is changed from extending to compression when the valve element 303 collides with the valve seat 306, and the movement direction of the movable core 301 is reversed to change acceleration so that the inductance of the solenoid 305 is changed. When the fuel injection valve 105 is closed, the driving current flowing in the solenoid 305 is blocked, counter electromotive force is applied to the solenoid 305, and the driving current is converged. Then, the counter electromotive force is gradually decreased. Thus, when the counter electromotive force is decreased, the inductance is changed to generate an inflexion point in the driving voltage (for example, the inflexion point of the driving voltage between Times T6 to T7 of FIG. 4). Since the inflexion point corresponds to the valve closing timing of the fuel injection valve 105, the valve closing time can be detected by measuring a period of time from the timing when the driving pulse is turned off to the inflexion point. The learning result (valve closing time) is output to the fuel injection pulse signal operation unit 201 and the fuel injection driving waveform command unit 202, and injection pulse on-time and a valve opening current are corrected for each injector (fuel injection valve 105).

Next, the deterioration determination unit 211 of the fuel injection control device 127 will be described. The deterioration determination unit 211 determines whether or not the fuel injection valve 105 has been deteriorated, namely, whether or not a variation in the injection amount has been increased. If the deterioration of the fuel injection valve 105 progresses, a variation in the injection amount is increased. However, since an individual change (a change of an individual difference) due to deterioration appears in the valve closing time (namely, valve behavior), the injection amount can be corrected by valve closing learning. The deterioration of the fuel injection valve 105 is dependent on the number of times of operations of the fuel injection valve 105. As the number of times of operations is increased, the valve behavior is changed due to abrasion of a friction surface or grinding of a collision surface, resulting in an increase in the injection amount. In addition, settling of the set spring 308 and the zero spring 309 also causes a change in the valve behavior, resulting in an increase in the injection amount.

Since the deterioration of the fuel injection valve 105 is dependent on the number of times of operations as described above, a deterioration state of the fuel injection valve 105 can be estimated by counting the number of times of injections.

Figure 5:
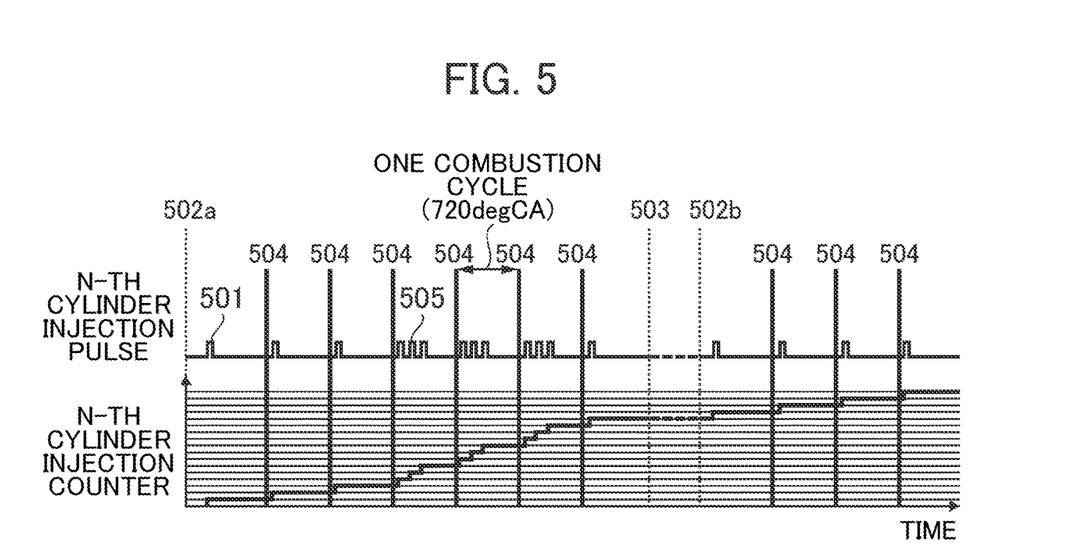
FIG. 5 is a diagram for showing an operation example of an injection counter.

A method of counting the number of times of injections of the fuel injection valve 105 will be described with reference to FIG. 5. FIG. 5 shows an injection pulse and an injection counter from the top502a and 502b of FIG. 5 indicate key-on timings, and 503 indicates a key-off timing. Namely, a period from 502a to 503 corresponds to one trip, and a period from 503 to 502b corresponds to key-off.

In addition, 504 indicates an injection reference position, and it is assumed that a period from the injection reference position 504 to the next injection reference position 504 corresponds to one combustion cycle, which corresponds to 720degCA if this is expressed by a crank angle. Injection parameters such as an injection start timing and the number of split injections is decided at the injection reference position 504, and the fuel is injected on the basis of the parameters.

When the injection pulse is turned on, the injection counter counts up. In the case where the injection is performed once in one combustion cycle as shown by the reference numeral 501, the injection counter counts up 1, and in the case where the injection is performed three times in one combustion cycle as shown by the reference numeral 505, the injection counter counts up three times in one combustion cycle.

In order to determine a deterioration state of the fuel injection valve 105, it is necessary to count the total number of times of injections from the early stage of the operation of the engine. Thus, it is necessary to hold a counter value even when the power supply of the ECU 109 is turned off. Therefore, a value is stored in a non-volatile memory such as an EEPROM at the time of key-off shown by the reference numeral 503, and the number of times of injections is started to be counted from the stored injection counter at the time of the next key-on (reference numeral 502b).

It should be noted that the injection counter only for one cylinder is described in the example of FIG. 5. However, an injection counter is prepared for each cylinder in a multi-cylinder engine, and a deterioration state can be managed for each cylinder by counting the number of times of injections for each cylinder.

Figure 6:
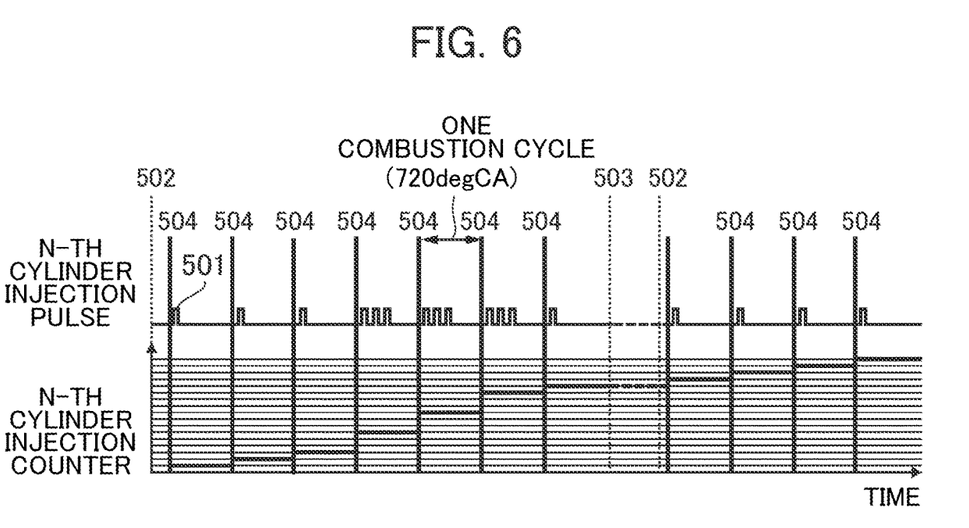
FIG. 6 is a diagram for showing an operation timing example of the injection counter.

In addition, since the injection parameter such as the number of split injections is decided at the injection reference position 504 as described above, the number of times of injections can be counted at the injection reference position 504 as shown in FIG. 6.

Figure 7:
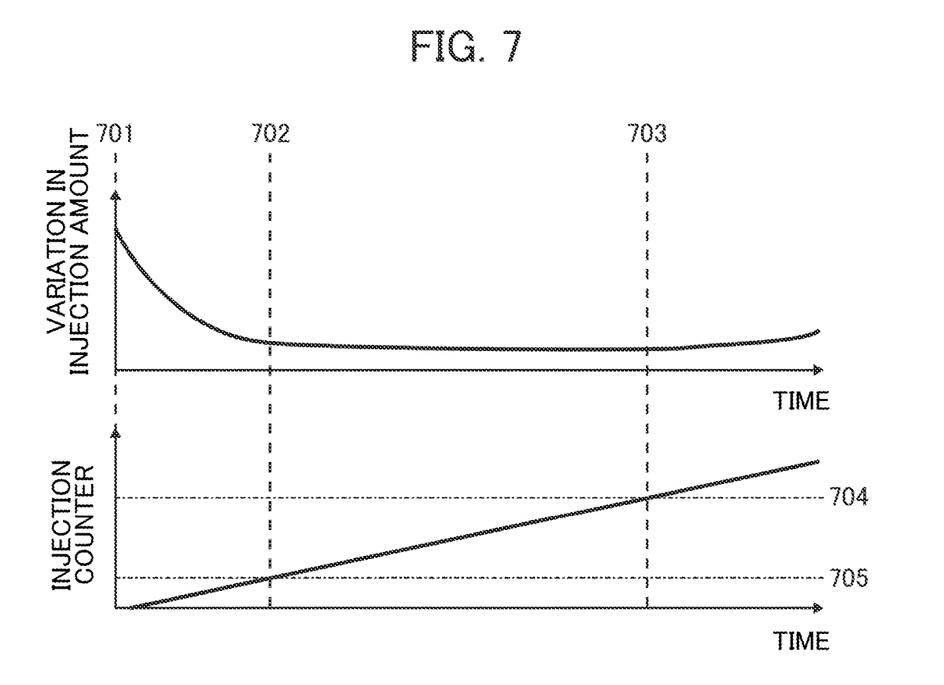
FIG. 7 is a diagram for showing a relation between a deterioration state and the number of times of injections of the fuel injection valve.

Next, learning frequency control for changing the learning frequency of the individual difference learning unit (injection amount learning unit) 212 using the learning frequency change unit 213 on the basis of the deterioration state of the fuel injection valve 105 determined by the deterioration determination unit 211 will be described with reference to FIG. 7. FIG. 7 shows a variation in the injection amount and an injection counter from the top. It should be noted that the variation in the injection amount in the drawing means the injection amount of the fuel injection valve 105 as a reference, or a difference from design specifications of the fuel injection valve 105.

The reference numeral 701 means a start of the operation of the fuel injection valve 105 at the time of engine assembly or vehicle assembly. As shown in FIG. 7, the variation in the injection amount is increased in an early stage of the start of the operation of the fuel injection valve 105. The variation is caused by surface variations of a movable part and a collision part of the fuel injection valve 105, and is gradually leveled by the operation of the fuel injection valve 105 to be decreased (reference numeral 702). Thereafter, as the number of times of operations of the fuel injection valve 105 is increased, deterioration of a sliding part and a collision part, settling of the spring, and deterioration due to adhesion of foreign substances progress to gradually increase the variation in the injection amount (reference numeral 703).

As described above, in a running-in period from the reference numeral 701 to the reference numeral 702, the frequency of individual difference learning is increased, and in a normal period (normal operation period) from the reference numeral 702 to the reference numeral 703 when it is determined that the running-in period has been completed, the frequency of individual difference learning is decreased. Thereafter, in a deterioration progress period subsequent to the reference numeral 703 when the deterioration of the fuel injection valve 105 progresses and the variation in the injection amount is increased, the frequency of learning is increased.

The determination of the above-described periods can be made by using threshold values 704 (upper limit value) and 705 (lower limit value) of the number of times of injections preliminarily obtained by an experiment such as a durability test. Namely, when the integrated value of the injection counter is smaller than DETTHRL (705), the learning frequency is increased by determining as the running-in period, and when the integrated value of the injection counter is equal to or larger than DETTHRL (705) and smaller than DETTHRH (704), the learning frequency is decreased by determining as the normal period. In addition, when the integrated value of the injection counter is equal to or larger than DETTHRH (704), the learning frequency is increased by determining as the deterioration progress period.

Figure 8:
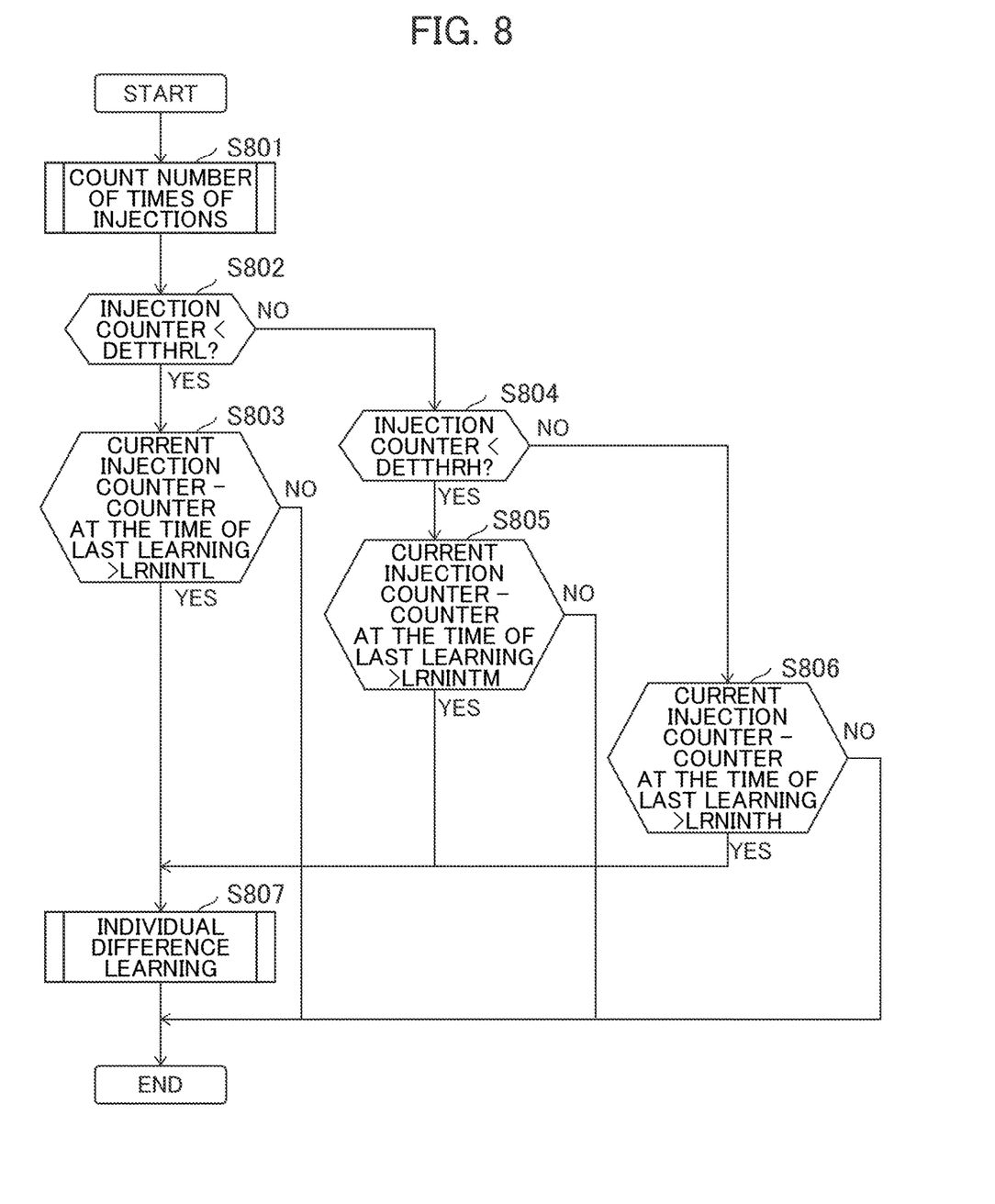
FIG. 8 is a flowchart for showing a control method (control flow) from determination of a deterioration degree to execution of individual difference learning.

Next, a flow before the individual difference learning will be described with reference to FIG. 8. FIG. 8 is a flowchart for showing a control flow from a deterioration degree determination to execution of the individual difference learning.

First, the number of times of injections is counted in Step S801. The counting of the number of times of injections has been described above, and thus the explanation thereof will be omitted.

Next, it is determined whether or not the injection counter is smaller than a predetermined reference value (DETTHRL) in Step S802. In the case where the injection counter is smaller than DETTHRL, it is determined as the running-in period, and the flow moves to Step S803. In Step S803, the injection counter value when executing the learning last time is compared with the current injection counter value. If the difference is larger than a predetermined reference value (running-in period learning interval LRNINTL), the flow moves to Step S807 to perform the individual difference learning.

On the other hand, in the case where it is determined that the injection counter is equal to or larger than DETTHRL in Step S802, the flow moves to Step S804 to determine whether or not the injection counter is smaller than the predetermined reference value (DETTHRH). In the case where the injection counter is smaller than DETTHRH, it is determined as the normal period (normal operation period), and the flow moves to Step S805. In Step S805, the injection counter value when executing the learning last time is compared with the current injection counter value. If the difference is larger than a predetermined reference value (normal period learning interval LRNINTM), the flow moves to Step S807 to perform the individual difference learning.

In addition, in the case where the injection counter is equal to or larger than DETTHRH in Step S804, it is determined as the deterioration progress period, and the flow moves to Step S806. In Step S806, the injection counter value when executing the learning last time is compared with the current injection counter value. If the difference is larger than a predetermined reference value (deterioration progress period learning interval LRNINTH), the flow moves to Step S807 to perform the individual difference learning.

As described above, according to the fuel injection control device and the fuel injection control method of the embodiment, it is possible to reduce the variation in the injection amount due to deterioration of the fuel injection valve by determining the deterioration state (deterioration degree) of the fuel injection valve to perform the individual difference learning (feedback) in accordance with the deterioration state (deterioration degree), and a control area where a minimal injection is performed can be enlarged. Accordingly, it is possible to prevent unintentional fluctuations in torque and worsening of fuel efficiency and exhaust performance in the internal combustion engine (engine).

Second Embodiment

Figure 9:
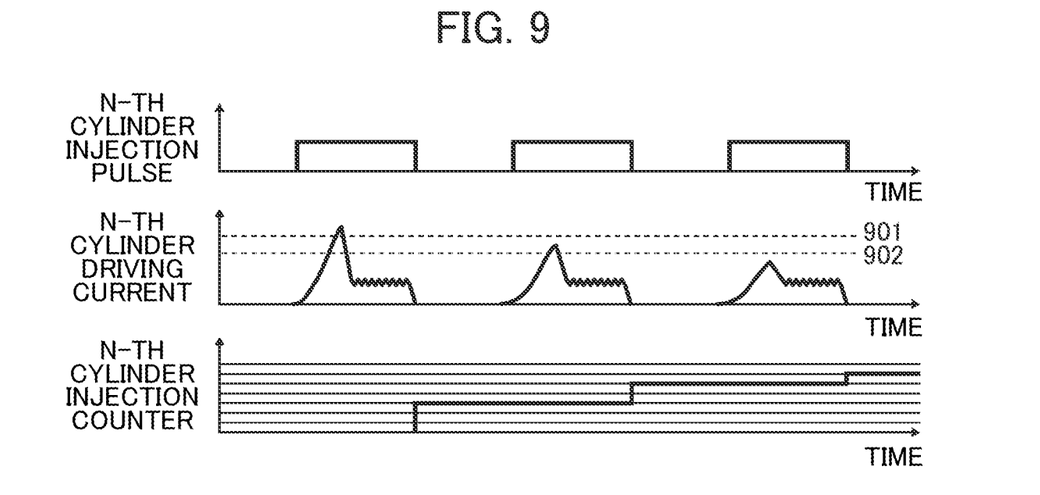
FIG. 9 is a diagram for showing a deterioration state estimation method using a driving current of the fuel injection valve.

Another method of counting the number of times of injections in Step S801 of FIG. 8 will be described with reference to FIG. 9. FIG. 9 is a diagram for showing a deterioration state estimation method on the basis of the driving current of the fuel injection valve 105, and shows transitions of the injection pulse, the driving current, and the injection counter from the top.

As described above, deterioration of the fuel injection valve 105 progresses due to abrasion of a movable part and an impact of a collision part. Namely, in the case of the collision part, energy added to the movable part is increased. In addition, as acceleration at the time of an operation is larger, an impact at the time of a collision becomes larger, and deterioration of a collision surface progresses.

For example, the momentum of a collision between the movable core 301 and the stator core 304 is changed depending on the magnitude of a valve opening current (driving current). As the valve opening current (driving current) is larger, the movable core 301 accelerates, and an impact at the time of a collision with the stator core 304 becomes larger. Thus, it is possible to determine that as the valve opening current (driving current) is larger, the deterioration progresses sooner.

Accordingly, the deterioration state of the fuel injection valve 105 of the embodiment is more accurately determined by weighting the injection counter in accordance with the magnitude of the valve opening current (driving current). For example, as shown in FIG. 9, in the case where the valve opening current (driving current) is larger than a first threshold value 901, a weighted value is set as "3", and the injection is counted three times although the injection is normally counted once. In addition, in the case where the valve opening current (driving current) is equal to or larger than a second threshold value 902 and smaller than the first threshold value 901, the weighted value is set as "2" to count twice.

It should be noted that the weighted value shown in the embodiment is only an example, and the magnitude of the weighted value (weighting) and the determination threshold values 901 and 902 of the valve opening current (driving current) may be set by preliminarily confirming a deterioration progress status by an experiment.

The deterioration progress (deterioration degree) of the fuel injection valve 105 can be accurately determined by the above-described method.

Third Embodiment

Figure 10:
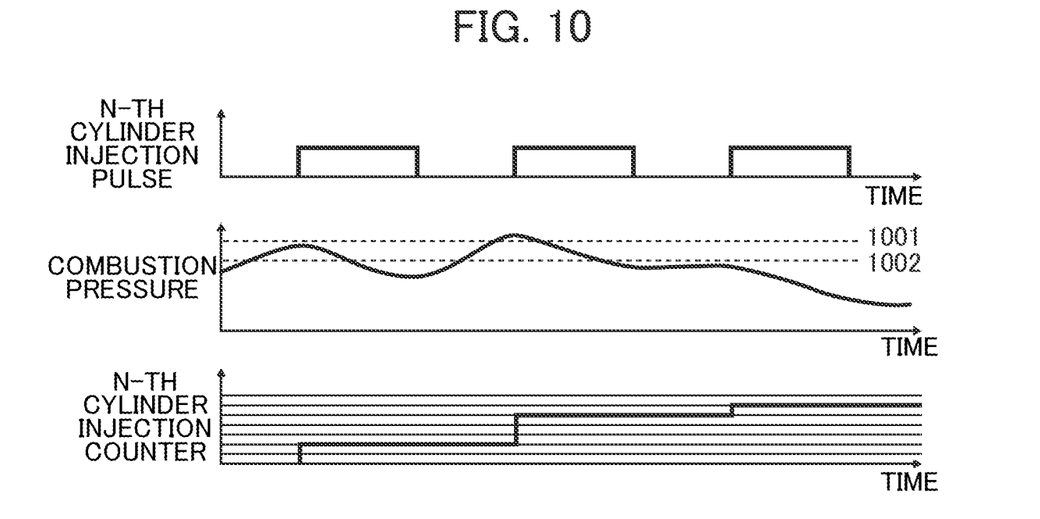
FIG. 10 is a diagram for showing a deterioration state estimation method using a combustion pressure in a combustion chamber.

A still another method of counting the number of times of injections in Step S801 of FIG. 8 will be described with reference to FIG. 10. FIG. 10 is a diagram for showing a deterioration state estimation method on the basis of the magnitude of the combustion pressure in the combustion chamber 121, and shows transitions of the injection pulse, the combustion pressure, and the injection counter from the top.

The deterioration progress (deterioration degree) of the fuel injection valve 105 is also changed depending on the combustion pressure in the combustion chamber 121. When the combustion pressure becomes large, force of pressing the valve element 303 towards the valve closing direction (especially when the fuel injection valve 105 is closed) is increased, and the acceleration of the valve element 303 after the injection pulse is turned off is increased. Thus, an impact at the time of a collision between the valve element 303 and the valve seat 306 becomes larger, and the deterioration progresses.

Accordingly, in the deterioration determination of the fuel injection valve 105 of the embodiment, as the combustion pressure value is larger, the weighted value (weighting) of the injection counter is increased.

For example, as shown in FIG. 10, in the case where the combustion pressure is larger than a first threshold value 1001, a weighted value is set as "3", and the injection is counted three times although the injection is normally counted once. In addition, in the case where the combustion pressure is equal to or larger than a second threshold value 1002 and smaller than the first threshold value 1001, the weighted value is set as "2" to count twice.

It should be noted that the weighted value shown in the embodiment is only an example, and the magnitude of the weighted value (weighting) and the determination threshold values 1001 and 1002 of the combustion pressure may be set by preliminarily confirming a deterioration progress status by an experiment.

In addition, the combustion pressure is determined at the timing when the injection pulse is turned on to operate the injection counter in FIG. 10. However, the combustion pressure may be determined at the timing when the injection pulse is turned off to operate the injection counter.

The deterioration progress (deterioration degree) of the fuel injection valve 105 can be accurately determined by the above-described method.

Fourth Embodiment

Figure 11:
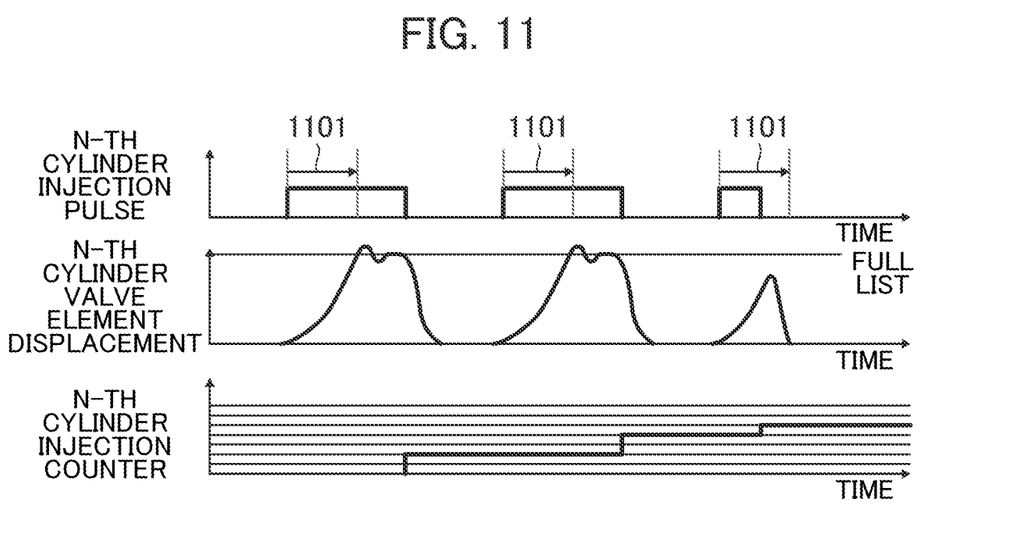
FIG. 11 is a diagram for showing a deterioration state estimation method using the injection pulse width of the fuel injection valve.

A still another method of counting the number of times of injections in Step S801 of FIG. 8 will be described with reference to FIG. 11. FIG. 11 is a diagram for showing a deterioration state estimation method on the basis of the length of the injection pulse width of the fuel injection valve, and shows transitions of the injection pulse, the valve element displacement, and the injection counter from the top.

When the injection pulse width of the fuel injection valve 105 is shortened, so-called half lift control in which the valve element 303 does not reach a full lift position and is closed is performed. At the time of the fuel injection by the half lift control, the movable core 301 does not collide with the stator core 304 and is closed. In addition, when the valve element displacement (the displacement amount of the valve element 303) is shortened, an impact of a collision between the valve element 303 and the valve seat 306 at the time of valve closure is also reduced. Since the deterioration progress becomes slow in the injection by the half lift control, the degree of deterioration progress can be accurately determined by making the weighted value (weighting) smaller.

For example, as shown in FIG. 11, in the case where the injection pulse width is equal to or larger than a threshold value 1101, the weighted value is set as "2" to count the injection counter twice. In the case where the injection pulse width is smaller than the threshold value 1101, the weighted value is set as "1" to count the injection counter once. Since the threshold value 1101 is a pulse width to perform the full lift control, the threshold value 1101 can be decided on the basis of the injection amount characteristic (Ti-Q characteristic) of the fuel injection valve 105.

The deterioration progress (deterioration degree) of the fuel injection valve 105 can be accurately determined by the above-described method.

It should be noted that when the injection pulse width is equal to or larger than the threshold value 1101, the weighted value is set as "2" and when the injection pulse width is equal to or smaller than the threshold value 1101, the weighted value is set as "1" in FIG. 11. However, this is only an example, and it is only necessary to establish a relative magnitude relation.

Fifth Embodiment

The method of determining the deterioration state of the fuel injection valve 105 by counting the number of times of injections has been described in each embodiment described above. However, the number of times of injections can be indirectly estimated by another method.

For example, since the deterioration of the fuel injection valve 105 progresses in accordance with the number of times of operations, the travel distance of a vehicle in which the internal combustion engine (engine) 101 is mounted and the deterioration progress (deterioration degree) of the fuel injection valve 105 are preliminarily set by an experiment as predetermined threshold values, and the learning can be executed in the case where the travel distance reaches the predetermined threshold value.

In this case, in consideration of the running-in period, the normal period (normal operation period), and the deterioration progress period of the fuel injection valve 105, in the case where the travel distance is short, the learning frequency is increased. In the case where the running-in period is finished, the learning frequency is decreased up to the travel distance turned into the deterioration progress period. In addition, after the travel distance turned into the deterioration progress period, the learning frequency is increased.

Figure 12:
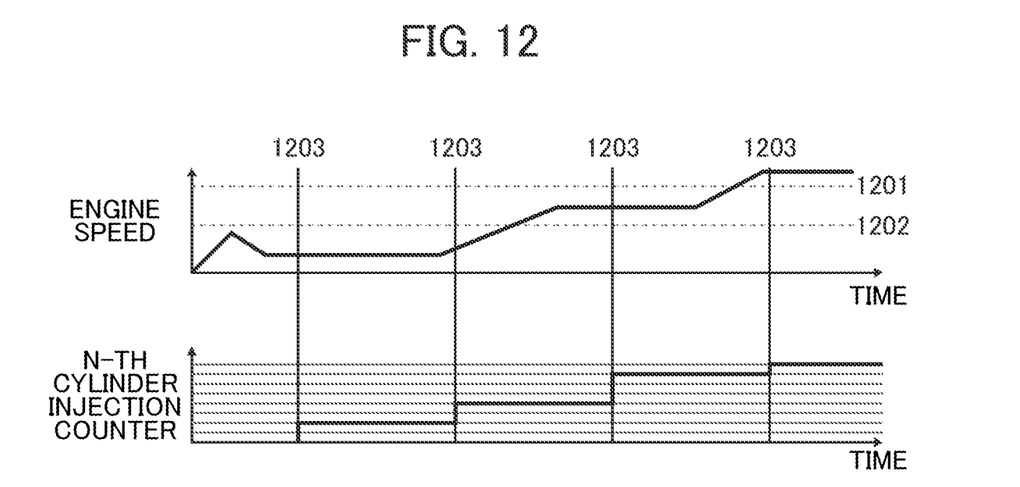
FIG. 12 is a diagram for showing a deterioration state estimation method using an engine speed.

In addition, as shown in FIG. 12, the deterioration progress (deterioration degree) of the fuel injection valve 105 can be also estimated on the basis of not the travel distance but the engine speed. FIG. 12 shows the engine speed and the injection counter from the top, and the reference numeral 1203 denotes a predetermined operation timing.

The number of split injections of one combustion cycle is decided by referring to a map of an engine speed and a load, and thus the number of times of injections can be estimated by monitoring the engine speed every fixed time on the basis of the engine speed and the elapsed time.

As described above, the number of split injections of one combustion cycle is decided using the engine speed as one parameter, and thus the number of times of injections during a predetermined time interval (between a timing 1203 and the next timing 1203) can be counted by confirming the engine speed at the predetermined timing 1203. The reference numerals 1201 and 1202 of FIG. 12 denote threshold values for deciding the number of split injections. For example, in the case where the engine speed is larger than a first threshold value 1201, the number of split injections is set as "1" to count once. In addition, in the case where the engine speed is equal to or larger than a second threshold value 1202 and smaller than the first threshold value 1201, the number of split injections is set as "3" to count three times. In the case where the engine speed is smaller than the second threshold value 1202, the number of split injections is set as "2" to count twice.

It should be noted that the injection count number in accordance with the engine speed shown in FIG. 12 is only an example, and can be arbitrarily decided in accordance with a relative relation to a predetermined threshold value.

As described above, according to each embodiment described above, a variation in the injection amount can be quickly reduced by setting appropriate learning frequency in accordance with the deterioration state of the fuel injection valve 105, and the half lift control area can be also enlarged. Thus, significant worsening of exhaust emission and unintentional fluctuations in torque can be avoided.

It should be noted that the control lines and the information lines considered to be necessary in the explanation are shown in the above-described respective embodiments, but all the control lines and the information lines in a product are not necessarily shown. In practice, almost all the configurations may be considered to be connected to each other.

In addition, the present invention is not limited to the above-described embodiments, and includes various modified examples. For example, the embodiments have been described in detail to easily understand the present invention, and the present invention is not necessarily limited to those including all the configurations described above. In addition, some configurations of an embodiment can be replaced by a configuration of another embodiment. In addition, a configuration of an embodiment can be added to a configuration of another embodiment. In addition, some configurations of each embodiment can be added to, deleted from, and replaced by other configurations.

In addition, the presence or absence of the present invention can be confirmed on the basis of not only a hardware configuration of an engine control unit (ECU), but also, for example, a control signal (pattern) and the like from the ECU for the fuel injection valve.

LIST OF REFERENCE SIGNS 101 internal combustion engine
102 piston
103 intake valve
104 exhaust valve
105 fuel injection valve
106 ignition plug
107 ignition coil
108 water temperature sensor
109 ECU (electronic control device)
110 intake pipe
111 exhaust pipe
112 three-way catalyst
113 oxygen sensor
115 collector
116 crank angle sensor
119 throttle valve
120 air flow meter
121 combustion chamber
122 accelerator opening sensor
123 fuel tank
124 low pressure fuel pump
125 high pressure fuel pump
126 fuel pressure sensor
127 fuel injection control device (control device of fuel injection valve)
128 exhaust cam
129 high pressure fuel pipe
201 fuel injection pulse signal operation unit
202 fuel injection driving waveform command unit (current waveform correction unit)
203 engine state detection unit
204 fuse
205 relay
206 high voltage generation unit (boosting device)
207a fuel injection driving unit (Hi) (switch)
207b fuel injection driving unit (Lo) (switch)
208 driving IC
209 battery voltage
210 high voltage
211 deterioration determination unit
212 individual difference learning unit (injection amount learning unit)
213 learning frequency change unit
301 movable core
302 housing
303 valve element
304 stator core
305 solenoid
306 valve seat
307 injection hole
308 set spring
309 zero spring

The invention claimed is:

1. A fuel injection control device controlling a fuel injection valve of an internal combustion engine, the device comprising:
one or more processors and one or more non-transitory computer-readable storage media, the non-transitory computer-readable storage media having stored thereon at least:
a deterioration determination unit that determines a deterioration state of the fuel injection valve;
an injection amount learning unit that learns the injection amount of the fuel injection valve; and
a learning frequency change unit that changes a learning frequency of the injection amount learning unit in accordance with the deterioration state of the fuel injection valve,
wherein in a case where a total number of injection count numbers of the fuel injection valve over a first predetermined number of engine cycles is smaller than a second predetermined threshold value, the deterioration determination unit determines the fuel injection valve to be in a running-in period, and
the learning frequency change unit increases the learning frequency of the injection amount learning unit.

2. The fuel injection control device according to claim 1, wherein the deterioration determination unit changes the number of injection pulses of the fuel injection valve in accordance with the driving current value of the fuel injection valve.

3. The fuel injection control device according to claim 1, wherein the deterioration determination unit changes the number of injection pulses of the fuel injection valve in accordance with a combustion pressure in the internal combustion engine.

4. The fuel injection control device according to claim 1, wherein the deterioration determination unit changes the number of injection pulses of the fuel injection valve in accordance with the injection pulse width of the fuel injection valve.

5. The fuel injection control device according to claim 1, wherein the deterioration determination unit changes the number of injection pulses of the fuel injection valve in accordance with the travel distance of a vehicle in which the internal combustion engine is mounted or the rotational speed of the internal combustion engine.

6. A fuel injection control method for controlling a fuel injection valve of an internal combustion engine, the method comprising:
(a) a step of counting a number of injection pulses of the fuel injection valve;
(b) a step of estimating a deterioration state of the fuel injection valve on the basis of the number of injection pulses counted in the step (a); and
(c) a step of correcting the injection amount of the fuel injection valve on the basis of the deterioration state of the fuel injection valve estimated in the step (b),
wherein in a case where a total number of injection pulses over multiple cycles of the engine counted in step (a) exceeds a predetermined threshold value,
determining that the fuel injection valve is deteriorated, and
correcting an injection pulse width and a driving current waveform of the fuel injection valve in accordance with the deterioration state.

7. The fuel injection control method according to claim 6, wherein the count is changed in accordance with a driving current value of the fuel injection valve.

8. The fuel injection control method according to claim 6, wherein the count is changed in accordance with a combustion pressure in the internal combustion engine.

9. The fuel injection control method according to claim 6, wherein the count is changed in accordance with the injection pulse width.

10. The fuel injection control method according to claim 6,
wherein the count is changed in accordance with the travel distance of a vehicle in which the internal combustion engine is mounted or the rotational speed of the internal combustion engine.

11. A fuel injection control device controlling a fuel injection valve of an internal combustion engine, the device comprising:
one or more processors and one or more non-transitory computer-readable storage media, the non-transitory computer-readable storage media having stored thereon at least:
a deterioration determination unit that determines a deterioration state of the fuel injection valve;
an injection amount learning unit that learns an injection amount of the fuel injection valve; and
a learning frequency change unit that changes a learning frequency of the injection amount learning unit in accordance with the deterioration state of the fuel injection valve,
wherein in a first case where a first number of injection pulses over multiple cycles of the engine falls within a first predetermined range, the deterioration determination unit determines that the fuel injection valve is not deteriorated, and the learning frequency change unit decreases the learning frequency of the injection amount learning unit; and
in a case where a second number of injection pulses over multiple cycles of the engine exceeds a second predetermined threshold value, the deterioration determination unit determines that the fuel injection valve is deteriorated, and the learning frequency change unit increases the learning frequency of the injection amount learning unit.

* * * * *